(12) United States Patent
Tzempetzis et al.

(10) Patent No.: US 12,005,915 B2
(45) Date of Patent: Jun. 11, 2024

(54) ADVANCED HIGHWAY ASSIST SCENARIO

(71) Applicant: Valeo Schalter und Sensoren GmbH, Bietigheim-Bissingen (DE)

(72) Inventors: Dimitrios Tzempetzis, Bietigheim-Bissingen (DE); Ornella Nath, Bietigheim-Bissingen (DE); Ivan Surovtcev, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 267 days.

(21) Appl. No.: 17/297,185

(22) PCT Filed: Nov. 29, 2019

(86) PCT No.: PCT/EP2019/083078
§ 371 (c)(1),
(2) Date: May 26, 2021

(87) PCT Pub. No.: WO2020/109547
PCT Pub. Date: Jun. 4, 2020

(65) Prior Publication Data
US 2022/0024475 A1  Jan. 27, 2022

(30) Foreign Application Priority Data
Nov. 29, 2018 (DE) ...................... 10 2018 130 243.6

(51) Int. Cl.
*B60W 50/12* (2012.01)
*B60W 30/18* (2012.01)
(Continued)

(52) U.S. Cl.
CPC ...... *B60W 50/12* (2013.01); *B60W 30/18109* (2013.01); *B60W 40/107* (2013.01);
(Continued)

(58) Field of Classification Search
CPC .......... B60W 50/12; B60W 30/18109; B60W 40/107; B60W 40/109; B60W 2554/4045; B60W 2554/4049
See application file for complete search history.

(56) References Cited

U.S. PATENT DOCUMENTS 9,555,801 B2 * 1/2017 Yester ................... B60W 10/18
9,701,307 B1    7/2017 Newman et al.
(Continued)

FOREIGN PATENT DOCUMENTS

CN    101500865 A    8/2009
CN    101674965 A    3/2010
(Continued)

OTHER PUBLICATIONS

"Optimal Braking and Steering Control for Active Safety" by N. Moshchuk et al., 2012 15th International IEEE conference on Intelligent Transportation Systems, Anchorage, Alaska, USA, Sep. 16-19, 2012. (Year: 2012).*

(Continued)

*Primary Examiner* — Peter D Nolan
*Assistant Examiner* — Tanya C Sienko
(74) *Attorney, Agent, or Firm* — Osha Bergman Watanabe & Burton LLP

(57) ABSTRACT

A multi-lane scenario driving support is provided for an ego vehicle in a traffic situation. Traffic surroundings are measured by an environment sensor system. The traffic surroundings include data about traffic and free space within an ego lane of the ego vehicle and an adjacent lane, and data about front proximity area and rear proximity area of the ego vehicle. A decision device evaluates the measured traffic surroundings and decides a driving operation to be executed by the ego vehicle based on at least one strategy. In the decision device, a cost function is used for choosing one of
(Continued)

Figure 1:
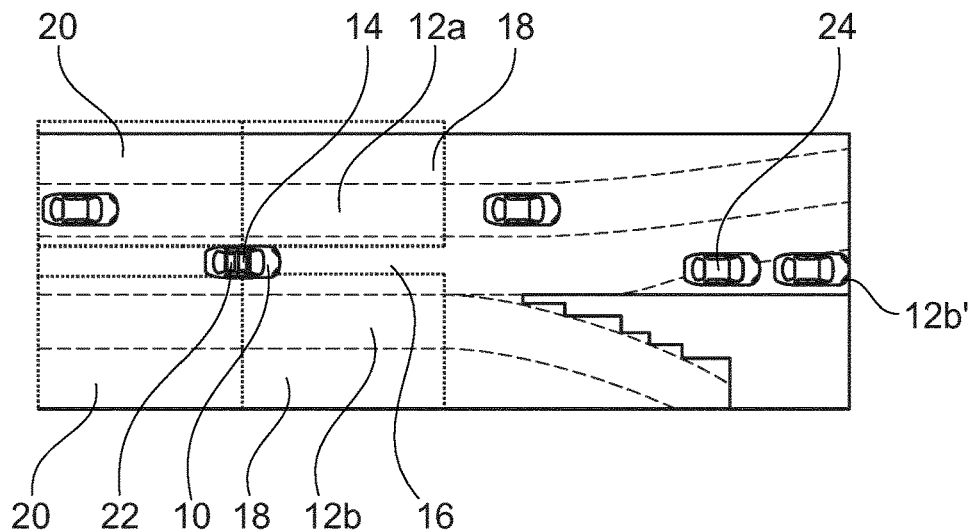

at least six strategies. The cost function is based on at least a core priority to avoid collision of the ego vehicle and not cause collision of the ego vehicle with a third party vehicle.

14 Claims, 2 Drawing Sheets

(51) Int. Cl.
  *B60W 40/107* (2012.01)
  *B60W 40/109* (2012.01)
(52) U.S. Cl.
  CPC ... *B60W 40/109* (2013.01); *B60W 2554/4045* (2020.02); *B60W 2554/4049* (2020.02)

(56) References Cited

U.S. PATENT DOCUMENTS

| | | | | |
|---|---|---|---|---|
| 2004/0090117 A1* | 5/2004 | Dudeck | ............ | B60W 30/0956 303/193 |
| 2006/0009910 A1 | 1/2006 | Ewerhart et al. | | |
| 2012/0101713 A1 | 4/2012 | Moshchuk et al. | | |
| 2014/0379167 A1 | 12/2014 | Flehmig et al. | | |
| 2017/0101097 A1 | 4/2017 | Buchner et al. | | |
| 2018/0059670 A1* | 3/2018 | Nilsson | ........... | B60W 30/18163 |
| 2018/0281785 A1* | 10/2018 | Berntorp | ............... | B60W 30/09 |
| 2018/0362033 A1 | 12/2018 | Newman et al. | | |
| 2019/0033871 A1* | 1/2019 | Lee | ........................ | G06V 10/44 |
| 2019/0377352 A1* | 12/2019 | Weißwange | ...... | B60W 60/0027 |
| 2020/0133280 A1* | 4/2020 | Seccamonte | ...... | B60W 60/0016 |

FOREIGN PATENT DOCUMENTS

| | | | | |
|---|---|---|---|---|
| CN | 105026237 A | 11/2015 | | |
| CN | 105939920 A | 9/2016 | | |
| CN | 107433946 A | 12/2017 | | |
| DE | 10114187 A1 | 9/2002 | | |
| DE | 102005002760 A1 | 8/2005 | | |
| DE | 102004029369 A1 | 6/2006 | | |
| DE | 102011054340 A1 | 4/2012 | | |
| DE | 102013103626 A1 * | 6/2014 | ......... | B60W 10/184 |
| DE | 102013208763 A1 | 11/2014 | | |
| DE | 102014213287 A1 | 1/2016 | | |
| JP | 2016218996 A | 12/2016 | | |
| WO | 2017008800 A1 | 1/2017 | | |

OTHER PUBLICATIONS

A Novel Cost Function for Decision-Making Strategies in Automotive Collision Avoidance Systems: M. Li et al. 2018 IEEE International Conference on Vehicular Electronics and Safety (ICVES) Sep. 12-14, 2018, Madrid, Spain (Year: 2018).*
Machine translation of DE 102013103626 A1, downloaded from IP.com Apr. 7, 2023 (Year: 2023).*
International Search Report and Written Opinion in corresponding International Application No. PCT/EP2019/083078, dated Apr. 3, 2020 (11 pages).
German Search Report issued in corresponding German Application No. 10 2018 130 243.6, dated May 17, 2019 (7 pages).
Chinese Office Action issued in Chinese Application No. 201980088232.8 dated May 19, 2023 (24 pages).
Office Action issued in counterpart European Application No. 19817172.0, dated Dec. 7, 2023 (6 pages).

* cited by examiner

ADVANCED HIGHWAY ASSIST SCENARIO

The present invention refers to a method for providing a multi-lane scenario driving support for an ego vehicle in a traffic situation. In the traffic situation the ego lane is partly or fully obstructed by other traffic participant(s). Traffic surroundings are measured by an environment sensor system. The traffic surroundings include data about traffic and free space within an ego lane of the ego vehicle and at least one adjacent lane, and data about front proximity area and rear proximity area of the ego vehicle. A decision device evaluates the measured traffic surroundings and decides a driving operation to be executed by the ego vehicle based on at least one (driving) strategy.

The present invention also refers to a system for providing a driver with assistance in a vehicle in the traffic situation using the above mentioned method.

The invention is situated in the field of Advanced Driver Assistance Systems (ADAS). These are systems to help the driver in the driving process. They mainly shall increase car safety and more generally traffic safety as many accidents occur due to human error. Most road accidents occurred due to human error. Advanced driver-assistance systems are systems developed to automate, adapt and enhance vehicle systems for safety and more comfortable driving. The automated system which is provided by ADAS to the vehicle is proven to reduce road fatalities, by minimizing the human error. Safety features are designed to avoid collisions and accidents by offering technologies that alert the driver to potential problems, or to avoid collisions by implementing safeguards and taking over control of the vehicle. An increasing number of modern vehicles have advanced driver-assistance systems such as electronic stability control, anti-lock brakes, lane departure warning, adaptive cruise control and traction control. These systems can be affected by mechanical alignment adjustments. This has led many manufacturers to require electronic resets for these systems, after a mechanical alignment is performed, ensure the wheel aligner you are considering to allow you to meet these safety requirements. Meanwhile ADAS are established features of the automobile industry, whereby many different features of ADAS exist and interact.

For example, a lane changing assistant is known from United States Patent Application Publication No. US 2006/0009910, and is used in connection with a speed control system, for instance, a so-called ACC system (Adaptive Cruise Control), which is not only in a position to regulate the speed of the vehicle to a speed desired by the driver, but is also in a position to adjust the speed of one's ego vehicle, if necessary, to the speed of the preceding vehicle, so that the latter is being followed at a suitable safety distance. For this purpose, an environment sensor system is present, for example, in the form of a radar sensor, using which the distances and also the relative speeds of preceding vehicles may be measured. Such ACC systems are particularly provided for travel on multi-lane expressways or highways.

The lane changing assistant is used to make it easier for the driver to change to an adjacent lane, for instance, when he wishes to start on a passing procedure.

The lane changing assistant known from the German Patent Application Publication DE 101 14 187 A1 is developed in such a way that, when a lane changing request by the driver is detected, it automatically initiates an acceleration procedure, so that pulling into the flowing traffic in the adjacent lane is made easier. The target speed or passing speed to be reached in this acceleration procedure, in this context, depends not only upon the speed of the vehicle, which is to be passed, proceeding ahead in one's ego lane, but also upon the speed of one or more additional vehicles that are located in the adjacent lane, ahead of one's ego vehicle. In this manner, one is able to avoid running up too closely to the vehicle in the adjacent lane.

A passing intention by the driver is recognized by the known system in that, for example, the driver activates the respective direction indicator. When the passing intention is recognized, the acceleration procedure is then triggered immediately.

In the same document the possibility is also mentioned that one might, for example, monitor the traffic following in the adjacent lane, using a rear-facing radar, and, when the follow-on traffic permits a passing procedure, to suggest a passing procedure to the driver automatically, by a suitable signal, which the driver may then confirm or not confirm.

Furthermore, Advanced Driver Assistance Systems such as blind spot warning systems are known which, with the aid of the environment sensor system, record the adjacent lane at the side of the vehicle and behind the vehicle, and warn the driver optically, acoustically or haptically when there is a lane change and a vehicle is located in the blind spot. However, the emission of such a warning signal may be disturbing to the driver, may be overlooked or may be wrongly interpreted by the driver.

In any of the above mentioned cases the system for providing a multi-lane scenario driving support for an ego vehicle in a traffic situation is applied up to a level 1 or level 2 system. The above levels refer to levels of automation. Automation levels reach from level 0 to 5.

The U.S. Department of Transportation National Highway Traffic Safety Administration (NHTSA) provided a standard classification system in 2013 which defined five different levels of automation, ranging from level 0 (no automation) to level 4 (full automation). Since then, the NHTSA updated their standards to be in line with the classification system defined by SAE International. SAE International defines six different levels of automation in their new standard of classification in document SAE J3016 that ranges from 0 (no automation) to 5 (full automation).

Level 0 includes no automation. The driver is in complete control of the ego vehicle and the system does not interfere with driving. Systems that may fall into this category are exemplary forward collision warning systems and lane departure warning systems.

Level 1 includes driver assistance. The driver is in control of the ego vehicle, but the system can modify the speed and steering direction of the vehicle. Systems that may fall into this category are exemplary adaptive cruise control and lane keep assist.

Level 2 includes partial automation. The driver must be able to control the ego vehicle if corrections are needed, but the driver is no longer in control of the speed and steering of the ego vehicle. Parking assistance is an example of a system that falls into this category.

Level 3 includes conditional automation. The system is in complete control of ego vehicle functions such as speed, steering, and monitoring the environment. A driver must be ready to intervene, when requested by the system to do so.

Level 4 includes high automation. The system is in complete control of the ego vehicle and human presence is no longer needed, but its applications are limited to specific conditions.

Level 5 includes full automation. The system is in complete control of the ego vehicle and human presence is no longer needed. The system is capable of providing the same aspects of a level 4, but the system can adapt to driving conditions.

A complication with automated driving systems is that in situations where unpredictable events such as weather or the driving behavior of others may cause fatal accidents due to sensors that monitor the surroundings of the vehicle not being able to provide corrective action. Such situations hinder the automation in the level 2 or level 3 area.

For example, a situation becomes critical and challenging for these systems when a two-lane road becomes a three-lane road and the newly created lane is full of standstill of third party vehicles and the last third party vehicle or several third party vehicles are standing partly between the middle lane and the new lane. It has turned out that such situations overtax the level 2 or level 3 automation systems because of the unclear situation or because of the multitude of possible driving behaviors.

It is an object of the present invention to provide a method for providing a multi-lane road traffic scenario driving support for an ego vehicle, and a system using this method, whereby the driver's safety and confidence in the system of his ego vehicle should be increased.

This object is achieved by the independent claims. Advantageous embodiments are given in the dependent claims.

The present invention provides a method for providing a multi-lane scenario driving support for an ego vehicle in a traffic situation in which the ego lane is partly or fully obstructed by other traffic participant(s), in particular a third party vehicle or vehicles or any other object.

Traffic surroundings are measured by an environment sensor system The traffic surroundings include data about traffic (e.g. third party vehicle(s) or other traffic participant(s)) and free space within an ego lane of the ego vehicle and at least one adjacent lane. In other words, the method comprises a step of measuring traffic surroundings by means of an environment sensor system. The traffic surroundings include data about front proximity area and rear proximity area of the ego vehicle. In particular, the front proximity area and the rear proximity area of the ego vehicle can be monitored by the environment sensor system while the ego vehicle drives on the ego lane. Optionally, the environment sensor system uses a map, in particular for generating the data about traffic and free space within the ego lane and at least one adjacent lane. For example, the map can be used to track the other traffic participant(s), e.g. third party vehicle(s), and to define the free space, in particular meaning the area where there is most probably no other traffic participant or object.

A decision device evaluates the measured traffic surroundings together with the speed of the ego vehicle and decides a driving operation to be executed by the ego vehicle based on at least one (driving) strategy, in particular one decided or chosen (driving) strategy. In other words, the method comprises a step of evaluating the measured traffic surroundings together with the speed of the ego vehicle and a step of deciding a driving operation to be executed by the ego vehicle by means of a decision device. Optionally, the decision device can take data about map information (e.g. information received or taken from the map) and a planned driving activity or driving operation into account. In particular, the decision device can decide the driving operation when a third party vehicle is detected in the ego lane at a specific distance. In particular, the decision device can decide the driving operation continuously (e.g. in each cycle) while the ego vehicle is driving, including in particular a case when it is predicted (e.g. using or by evaluating the traffic surroundings) that an adjacent lane is formed out of the ego lane.

In the decision device a cost function is used or implemented for choosing one of at least six strategies, whereby the cost function is based on at least a core priority. In other words, the method comprises a step of using a cost function for choosing one of at least six strategies by means of the decision device. The core priority (e.g. of the decision device) is to avoid collision and not cause collision of the ego vehicle with a third party vehicle. For example, the third party vehicle can be in the ego lane or in an adjacent lane. One could also say that it is a core priority of the decision device to avoid collision and not cause collision.

In particular, the cost function can be used in mathematical optimization and decision theory. It can be a function that maps an event (e.g. strategy here) onto a real number representing some "cost" associated with the event. An optimization problem can seek to minimize the cost function. Therefore, the method can comprise an optimization step, in particular of seeking to minimize the cost function, in particular for choosing one of the at least six strategies.

The decision device by means of the cost function chooses one of at least the following six strategies (e.g. to gain the core priority), namely: (only) braking in the ego lane, to combine braking and steering within the ego lane of the ego vehicle, (only) steering within the ego lane of the ego vehicle to avoid an obstacle, to (only) full-brake in the ego lane of the ego vehicle, to combine braking and steering towards or when entering temporarily adjacent lane, and (only) steering towards or when entering temporarily an adjacent lane. In other words, the method comprises a step of choosing by means of the cost function one of the at least six strategies by means of the decision device.

The wording ego vehicle means the driver's own vehicle, especially a car or truck. The wording ego lane means the lane on which the ego vehicle drives. The wording multi-lane can in particular mean an ego lane and at least one or two adjacent lanes. The wording multi-lane road can in particular include the case when a two-lane road becomes a three-lane road.

The basic idea of the invention is to gain an opportunity to monitor sufficiently an ego lane, further road traffic and the congestion situation. It turns out that these are the main strategies to avoid collision of the ego vehicle and not cause collision of the ego vehicle with a third party vehicle. It also allows in particular to handle the situation of the ego lane being partly occupied by another vehicle or any other object. This means, the invention concerns a method for an at least semi-autonomous ego vehicle(s) on a multi-lane road. It is monitored whether the adjacent lanes are free. If there is an obstacle in the lane of the ego vehicle, the decision device decides, depending on the occupancy of the adjacent lanes, what driving operation the ego vehicle should execute, e.g. whether the ego vehicle brakes, dodges or changes lanes.

A main benefit of the above-mentioned method is the created possibility for intuitive driving in a complex traffic scenario. Further, there is a safe system reaction avoiding collision in a complex traffic scenario. Preferably, without such method the driver shall respond and take back the control quickly. As a consequence, the confidence of the end user into the system is increased. Thus, a basis is created towards higher levels of automation where less driver attention and less driver actions are needed.

This method shall be applied preferably to a level 2 or level 3 system which combines longitudinal and lateral control.

In one embodiment, the cost function for choosing one of the at least six strategies is based on the following parameters: core priority (meaning avoiding collision of the ego vehicle and to not cause collision of the ego vehicle with a third party vehicle), and, assuming that core priority is guaranteed, at least one of the following additional parameters: minimum lateral acceleration of the ego vehicle, minimum longitudinal acceleration of the ego vehicle, and avoid leaving the ego lane (no ego lane departure). In other words, the cost function evaluates the following parameters: core priority, and, assuming that core priority is guaranteed, at least one of the following additional parameters: minimum lateral acceleration of the ego vehicle, minimum longitudinal acceleration of the ego vehicle, and avoid leaving the ego lane (with the ego vehicle). In particular, the cost function can evaluate all the above mentioned parameters.

In one embodiment, the decision device chooses the strategies by means of the cost function in the following (exact) order (e.g. to gain the core priority): (only) braking in the ego lane, to combine braking and steering within the ego lane of the ego vehicle, (only) steering within the ego lane of the ego vehicle to avoid an obstacle, to (only) full-brake in the ego lane of the ego vehicle, to combine braking and steering towards or when entering temporarily an adjacent lane, and steering towards or when entering temporarily an adjacent lane. In other words, the cost function can preferably be designed so that the at least six strategies are considered or prioritized in the following (exact) order: (only) braking in the ego lane, to combine braking and steering within the ego lane of the ego vehicle, (only) steering within the ego lane of the ego vehicle to avoid an obstacle, to (only) full-brake in the ego lane of the ego vehicle, to combine braking and steering towards or when entering temporarily an adjacent lane, and steering towards or when entering temporarily an adjacent lane. However, it should be understood that the cost function can also be designed so that the at least six strategies are considered or prioritized in another order.

A most preferred first strategy to gain the core priority can be only braking in the ego lane. This feature causes the least discomfort to the driver and has the least risk to the vehicles surrounding the ego vehicle.

In case of braking in the ego lane, it is preferred that it happens with a deceleration exemplary up to and including $-5$ m/s$^2$. This maximum value of deceleration makes the vehicle behavior appear as inconspicuous as possible and resembles the braking behavior of a driver without automated driving.

If the feature of braking in the ego lane is chosen by the decision device, the deceleration limit can vary based on selected driving mode. In particular, the driving modes can be eco, comfort and sports, whereby the fastest deceleration might be achieved by the sports mode. The slowest deceleration might be achieved by the eco or the comfort mode. This depends on the environmental conditions, which can have an influence on the most economical way of driving.

A further, second strategy to gain the core priority can be to combine braking and steering within the ego lane of the ego vehicle, whereby this second strategy or step is a strategy subordinate to the first strategy of only braking in the ego lane. This step is subordinate because the driver perceives an unrest due to the additional steering in addition to braking, and drivers of surrounding vehicles may also be distracted by the driving maneuver of the ego vehicle.

A next preferred, third strategy to gain the core priority can be only steering within the ego lane of the ego vehicle to avoid an obstacle. This third strategy or step is preferably a strategy subordinate to the second strategy to combine braking and steering within the ego lane of the ego vehicle. This third strategy or step is subordinate to the above strategies or steps because it has been found that a steering maneuver without deceleration increases the driver's stress due to the essentially constant speed during the steering process. In general, this third strategy can be a strategy subordinate to any or all of the preceding mentioned strategies.

The priority which strategy (or step) is selected depends in particular on the prioritization between the strategies. In particular, the prioritization between combining the second strategy of braking and steering within the ego lane of the ego vehicle and the third strategy of only steering within the ego lane of the ego vehicle to avoid an obstacle can be based on the relative speed between the ego vehicle and the obstacle. In other words, if the second strategy to combine braking and steering within the ego lane of the ego vehicle as well as the third strategy of only steering within the ego lane of the ego vehicle to avoid an obstacle can ensure that a collision can be avoided, the choice of strategy depends preferably on the relative speed between the obstacle and the ego vehicle. Optionally or in addition to the relative speed, the available space or distance between the ego vehicle and the obstacle can also be relevant.

Next, it may be envisaged that a fourth strategy to gain the core priority is to only full-brake in the ego lane of the ego vehicle. This fourth strategy or step happens preferably up to the allowed emergency braking threshold. This fourth strategy or step is preferably a strategy subordinate to the third strategy of only steering within the ego lane of the ego vehicle to avoid an obstacle. Although an emergency braking maneuver increases the probability that an accident will be avoided, this step is not a common means of preventing the driver from feeling unwell on the road. For this reason, the fourth strategy or step is subordinate to the third strategy or step of only steering within the ego lane of the ego vehicle to avoid an obstacle. However, it is preferable that this step happens up to the allowed emergency braking threshold, in particular at least if the driver's safety can be guaranteed in order not to strain the driver's confidence in the ego vehicle. This fourth strategy is preferred in case of collision mitigation, namely when collision cannot be avoided. In general, this fourth strategy can be a strategy towards any or all of the preceding mentioned strategies.

Another, fifth strategy to gain the core priority can be to combine braking and steering towards or when entering temporarily an adjacent lane. This fifth strategy or step is preferably a strategy subordinate to the fourth strategy to only full-brake in the ego lane of the ego vehicle. The subordinated classification is based on the recognition that although a full-brake puts more physical strain on the driver than a lane change, but the ego vehicle cannot predict the driving behavior of the surrounding vehicles, so that the driver's safety should be guaranteed at this point. In general, this fifth strategy can be a strategy subordinate to any or all of the preceding mentioned strategies.

A further, sixth strategy to gain the core priority can be only steering towards or when entering temporarily an adjacent lane. This sixth strategy or step is preferably a strategy subordinate to the fifth strategy to combine braking and steering towards or when entering temporarily an adjacent lane. One possible advantage of this sequence is that by steering to an adjacent lane without braking, obstacles approaching from the front, such as uncontrolled oncoming vehicles, can be avoided faster and thus more safely than would be the case with a combination of steering and braking. The basic assumption is that a lateral accident is less risky than a frontal accident. In general, this sixth strategy can be a strategy subordinate to any or all of the preceding mentioned strategies.

The present invention also provides a system for providing a multi-lane scenario driving support for an ego vehicle in a traffic situation, using a method according to any of the preceding features and comprising the environment sensor system and the decision device. In particular, the environment sensor system and/or the decision device can be adapted or designed to carry out the method according to any of the preceding features. In particular, the environment sensor system can be adapted or designed to measure the traffic surroundings. In particular, the environment sensor system can be adapted or designed to monitor the front proximity area and the rear proximity area of the ego vehicle, while the ego vehicle drives on the ego lane. In particular, the environment system can include one or several sensor(s). The decision device can be adapted or designed to evaluate the measured traffic surroundings together with the speed of the ego vehicle and to decide a driving operation to be executed by the ego vehicle based on at least one strategy. The decision device can be adapted or designed to use or implement a cost function for choosing one of at least six strategies, the cost function being based on at least a core priority. The decision device can be adapted or designed so that the core priority is to avoid collision of the ego vehicle and not cause collision of a third party vehicle. The decision device can be adapted or designed to choose one of the at least six strategies by means of the cost function, in particular to gain the core priority.

Optionally, the environment sensor system can be adapted or designed to use a map, in particular for generating the data about traffic and free space within the ego lane and at least one adjacent lane. For example, the environment sensor system can be adapted or designed to use the map to track the other traffic participant(s), e.g. third party vehicle(s), and to define the free space, in particular meaning the area where there is most probably no other traffic participant or object.

A preferred embodiment of the invention is that the environment sensor system includes a front camera. A camera has the advantage that on the one hand it is inexpensive and on the other hand it tends towards the highest possible measurement quality due to its high resolution.

In order to further increase the measuring quality, it may be provided that the environment sensor system includes a radar cocoon. A radar has a lower resolution than a camera, but a radar is weather-independent, because the long wavelengths are hardly disturbed by the atmosphere and therefore fog, light rain and snow can be penetrated, so that safety can be significantly increased. In addition, a radar is independent of lighting conditions, which makes day and night measurements possible, which also increases the safety. A cocoon has the advantage of 360 degrees detection.

The measuring quality can also be increased if, for example the environment sensor system includes a laser scanner cocoon. Laser measurements have the advantage that they are very precise and also have a very short reaction time, so that safety can be significantly increased. A cocoon has the advantage of 360 degrees detection.

In order to increase the driver's safety as far as possible, it can be advantageous that measurement data from the vicinity of the vehicle are recorded as completely as possible. Therefore, a preferred embodiment of the invention is that the environment sensor system includes a fully surround system.

In particular, it is foreseen that the sensory units of the environment sensor system may be cumulative or redundant. This increases the measurement quality and reduces the risk of wrong decisions of the decision device based on missing or wrong measurement results.

These and other aspects of the invention will be apparent from and elucidated with reference to the embodiments described hereinafter. Individual features disclosed in the embodiments can constitute alone or in combination an aspect of the present invention. Features of the different embodiments can be carried over from one embodiment to another embodiment.

Figure 2:
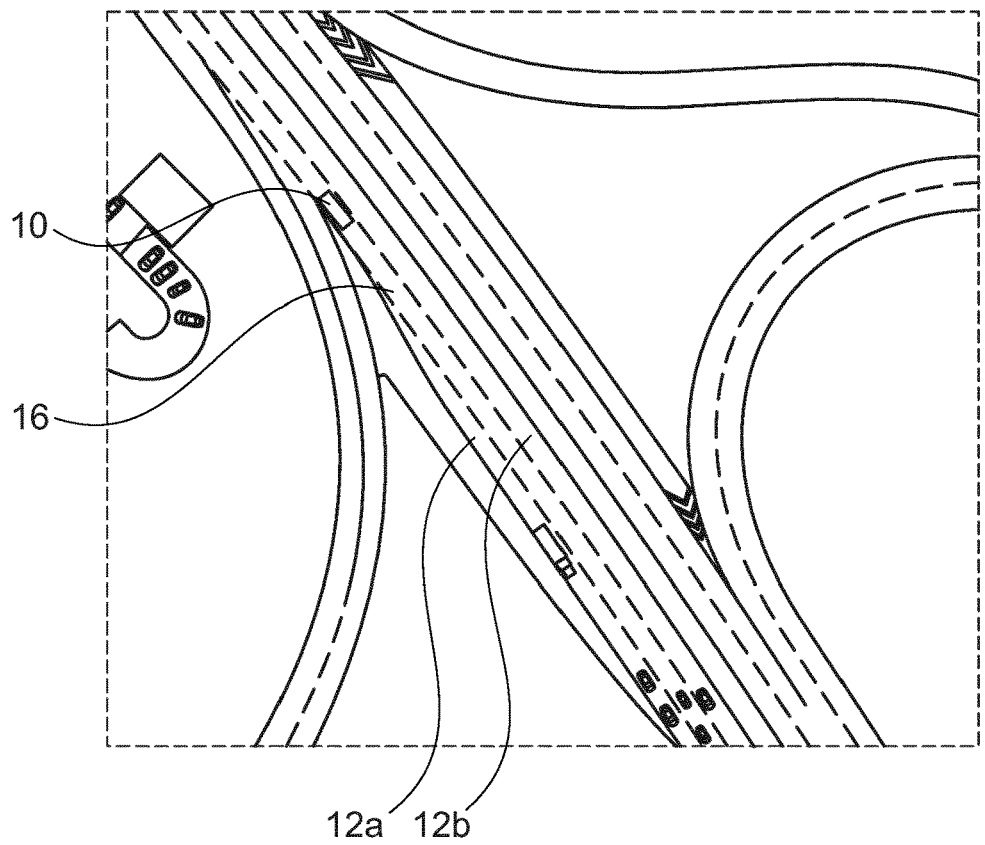
Figure 3:
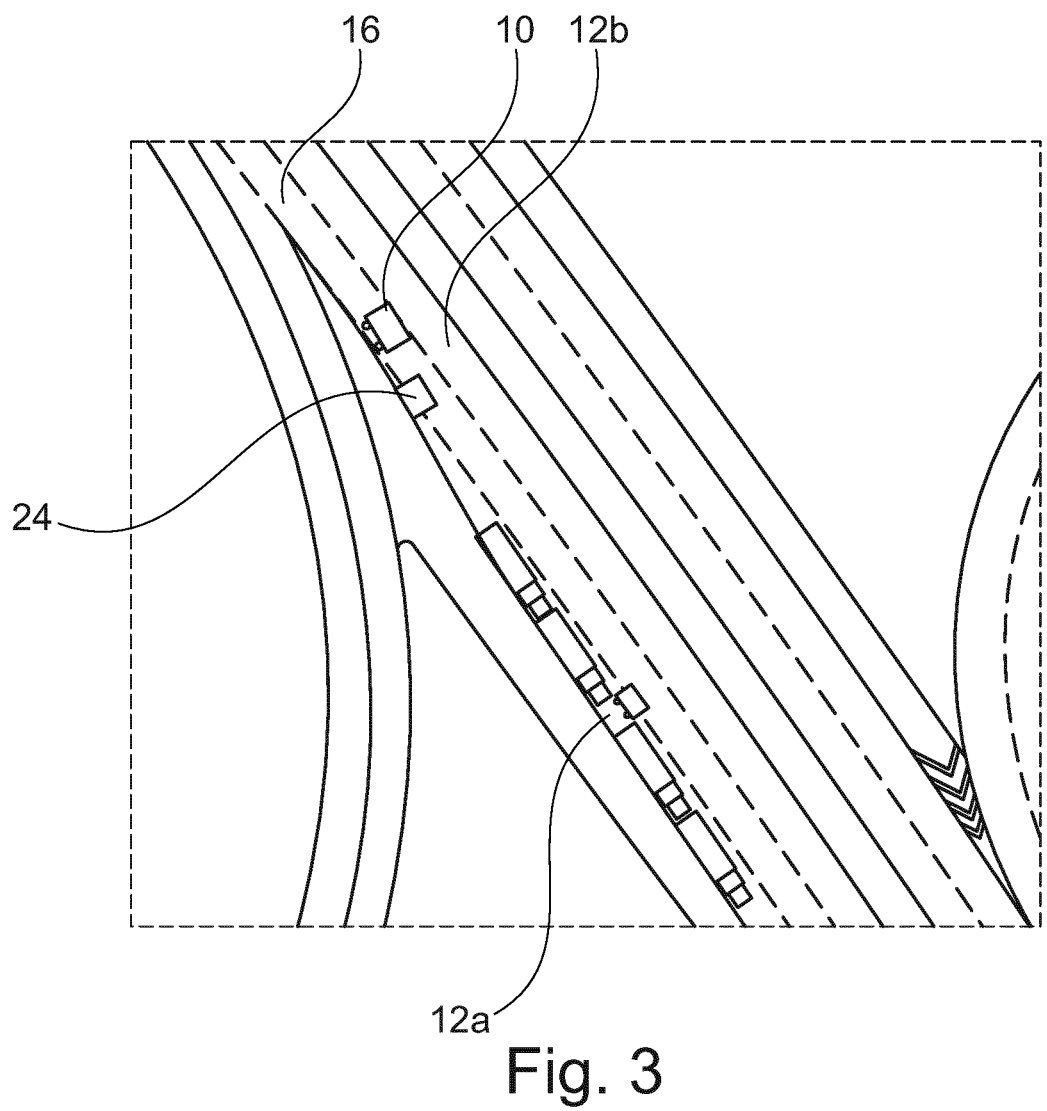

In the drawings:

FIG. 1 shows a schematic top view of a critical traffic situation on a multi-lane road to be solved by a preferred embodiment of the invention, FIG. 2 shows a schematic top view of a critical traffic situation on a multi-lane road to be solved by the preferred embodiment of the invention similar to FIG. 1 and FIG. 3 shows a schematic top view of a critical traffic situation on a multi-lane road to be solved by the preferred embodiment of the invention similar to FIGS. 1 and 2.

FIG. 1 shows a traffic situation in which the inventive method is applied. In particular, the present invention provides a method for providing a multi-lane scenario driving support for an ego vehicle 10 in a traffic situation. As shown more precisely, the ego vehicle is driving on its lane, which is also called ego lane 16. The wording ego vehicle means the driver's own vehicle, especially a car or truck. The wording ego lane means the lane on which the ego vehicle 10 drives. As can be seen in FIG. 1, the multi-lane road includes the case when a two-lane road becomes a three-lane road.

The traffic surroundings are measured by an environment sensor system 14, which is shown as a part of the ego vehicle 10. The traffic surroundings include data about traffic and free space within the ego lane 16 of the ego vehicle 10 and at least an adjacent lane 12a, 12b. Present at FIG. 1, there are two adjacent lanes to each side of the ego vehicle 10. Data is measured about front proximity area 18 and rear proximity area 20 of the ego vehicle 10, whereby a decision device 22 evaluates the measured traffic surroundings together with the speed of the ego vehicle 10 and decides a driving operation to be executed by the ego vehicle 10 based on at least one (driving) strategy.

The decision device 22 takes data about map information and a planned driving activity or driving operation into account. The map is used to track the other traffic participant(s), e.g. third party vehicle(s), such as third party vehicle 24. The map is also used to define the free space, meaning the area where there is most probably no other traffic participant or object.

The decision device 22 decides the driving operation when the third party vehicle 24 is detected in the ego lane 16 at a specific distance. The decision device 22 decides the driving operation continuously (e.g. in each cycle) while the ego vehicle 10 is driving. This includes in particular the case when it is predicted (by using or evaluating the measured traffic surroundings) that an adjacent lane 12b' is formed out of the ego lane 16, as shown in FIG. 1.

In the decision device 22 a cost function is used/implemented for choosing one of at least six strategies. The cost function is based on at least a core priority. It is the core priority to avoid collision and not cause collision of the ego vehicle 10 with a third party vehicle 24. In FIG. 1 the third party vehicle can be the vehicle 24 in the ego lane and/or a vehicle in an adjacent lane 12a, 12b. By means of the cost function the decision device 22 choses one of at least six strategies to gain the core priority. These six strategies are (only) braking in the ego lane 16, to combine braking and steering within the ego lane 16 of the ego vehicle 10, (only) steering within the ego lane 16 of the ego vehicle 10 to avoid an obstacle, to (only) full-brake in the ego lane 16 of the ego vehicle 10, to combine braking and steering towards or when entering temporarily an adjacent lane 12a, 12b and steering towards or when entering temporarily an adjacent lane 12a, 12b.

The cost function can be based not only on the core priority, but also on at least one additional parameter, assuming that core priority is guaranteed. The additional parameters can for example be: minimum lateral acceleration of the ego vehicle 10, minimum longitudinal acceleration of the ego vehicle 10, and avoid leaving the ego lane 16 (meaning no ego lane departure).

FIG. 1 also shows that a new lane of the ego lane 16 is opened in the driving direction of the ego vehicle 10. It corresponds to the teaching of the invention that the ego vehicle 10 or its decision device 22 selects from one of the programmed strategies to fulfill the core priority, in order to grant the driver of the ego vehicle 10 a safe and at the same time comfortable ride.

The basic idea of the invention is to gain an opportunity to monitor sufficiently an ego lane, further road traffic and the congestion situation. It turns out that these are the main strategies to avoid collision and not cause collision. It also allows in particular to handle the situation of ego lane 16 being partly occupied by a third party vehicle 24 or any other object. This means, the invention concerns a method for an at least semi-autonomous ego vehicle 10 on a multi-lane road. It is monitored whether the adjacent lanes 12a, 12b are free. If there is an obstacle in the lane 16 of the ego vehicle 10, as for example third party vehicle 24, the decision device 22 decides, depending on the occupancy of the adjacent lanes 12a, 12b, what driving operation the ego vehicle should execute, e.g. whether the ego vehicle 10 brakes, dodges or changes lanes.

A main benefit of the above-mentioned method is the created possibility for intuitive driving in a complex traffic scenario. Further, there is a safe system reaction avoiding collision in a complex traffic scenario. Preferably, without such method the driver shall respond and take back the control quickly. As a consequence, the confidence of the end user is increased into the system of the ego vehicle. Thus, a basis is created towards higher level of automation where less driver attention and less driver actions are needed.

This method shall be applied preferably to a level 2 or level 3 system which combines longitudinal and lateral control.

While the ego vehicle 10 drives on the ego lane 16, the environment sensor system 14 (including sensors) monitors the front proximity area 18 and the rear proximity area 20. According to the situation shown in FIG. 1, it can be seen that a new adjacent lane 12b' forms in front of the ego vehicle 10. A third party vehicle 24 is partly on the ego lane 16 and partly on the adjacent lane 12b' in order to integrate into the adjacent lane 12b'. The basic assumption is that the ego vehicle 10 approaches the aforementioned third party vehicle 24 (e.g. third party vehicle 24 is detected in the ego lane 16 at a specific distance) and that the system for providing a multi-lane scenario driving support for an ego vehicle 10 in a traffic situation is intended to apply the logic according to doctrine of the invention. For this the ego vehicle 10 with its environment sensor system 14 monitors the traffic situation surrounding the ego vehicle 10. In particular, redundant and cumulative sensors can be used to exclude possible measurement errors and thus increase driver safety and comfort. The decision device 22 processes this data and takes map information into account. This means that even if it is not yet possible to detect a new adjacent lane 12b' using the sensors, it can be predicted that it will be formed. If available, it may also be possible to use data from an ongoing vehicle navigation system to further improve the prediction quality and thus solve the object of the invention as reliably as possible.

In any case, it is the core priority of the system and the applied method, to avoid a collision and not cause a collision. The decision device 22 by means of the cost function chooses one of at least six strategies to gain the core priority. The core priority is achieved particularly preferably by a following order of the individual strategies, whereby this represents only a preferred arrangement of the invention. In principle, it is also possible to sort individual strategy points differently, depending on the cost function.

According to a preferred form of the invention, the ego vehicle 10 will first try to (only) brake in the ego lane 16. This first strategy or step should take place as early as possible and preferably with a maximum deceleration of −5 m/s$^2$ in order to give the driver an optimal feeling of safety and driving comfort. Ideally, the third party vehicle 24 is fully integrated into the new adjacent lane 12b' when the ego vehicle 10 passes by.

If the decision device 22 concludes that the above-mentioned third party vehicle 24 is so far in the ego lane 16 that braking alone is not sufficient to avoid a collision, braking and steering within the ego lane 16 is preferably combined as the next (second) strategy or step, so that the ego vehicle 10 circumvents the third party vehicle 24 within the ego lane 16 sufficiently carefully.

Some situations, though, may arise in which braking together with steering is not sufficient for reasons of danger, e.g. if the ego lane 16 should quickly move away from a danger point, or if braking would limit the driver's driving comfort, e.g. due to a gradient. In this case, (only) steering within the ego lane 16 of the ego vehicle 10 is intended to avoid an obstacle, in particular as a third strategy or step.

However, it becomes risky if the third party vehicle 24 is further away than in FIG. 1 in ego lane 16 or if the vehicle shown in FIG. 1 in adjacent lane 12a suddenly moves in front of ego vehicle 10 in the direction of adjacent lane 12b' and blocks ego lane 16. Depending on the surrounding traffic situation and the distance to the third party vehicle, the above mentioned strategies may not be sufficient to reach the core priority. In this example, (only) full-braking in the ego lane 16 of the ego vehicle 10 is preferred, in particular as a fourth strategy or step.

If the braking distance for the ego vehicle 10 is not sufficient to prevent a collision with respect to the above exemplary scenario, a next (fifth) strategy or step could be to combine braking and steering towards or when entering temporarily an adjacent lane 12a, 12b. This strategy is of secondary importance to the one mentioned above because an evasive maneuver into an adjacent lane 12a, 12b is associated with a risk for other road users.

Depending on the hazard situation, the combination of braking and steering towards or when entering temporarily an adjacent lane 12a, 12b may not be sufficient in the above-mentioned exemplary scenario, so that braking is then omitted and only one steering towards or when entering temporarily an adjacent lane 12a, 12b takes place (sixth strategy or step). However, this is the last preferred and yet effective strategy, because an unchecked lane change could endanger or at least irritate the surrounding road users. For this, to perform any lateral action, which requires entering the adjacent lane, has as requirement that lane change conditions are checked. Hence, rear and side detections may be mandatory requirements of this strategy.

In principle, according to the doctrine of the invention, the preferred strategy for the above-mentioned strategies is always to follow a strategy only if the strategies for achieving the core priority mentioned in this strategy are not applicable as determined by the decision device 22.

FIG. 2 shows a situation which is critical and challenging for ADAS according to a state of the art ego vehicle 10 on its ego lane 16, when a newly created, adjacent lane 12a is full of standstill of third party vehicles. In this context, a driving situation threatens to become confusing. The ego vehicle 10 is at risk of performing abrupt or unsafe driving maneuvers due to overlapping or contradictory specifications, when vehicles drive into the new lane.

FIG. 3 shows another situation which is critical and challenging for ADAS according to a state of the art ego vehicle 10 on its ego lane 16, when standstill vehicles cross two lanes at the same time, namely a newly created, adjacent lane 12a and the ego lane 16.

The critical traffic situations shown in the FIGS. 2 and 3 are not exhaustive, but merely exemplary. In reality, there are other critical traffic situations that are not described here.

A most preferred, first strategy to gain the core priority is (only) braking in the ego lane 16. This feature causes the least discomfort to the driver and has the least risk to the vehicles surrounding the ego vehicle.

In case of braking in the ego lane, it is preferred that it happens with a deceleration up to and including $-5$ m/s$^2$. This maximum value of deceleration makes the vehicle behavior appear as inconspicuous as possible and resembles the braking behavior of a driver without automated driving.

If the strategy of (only) braking in the ego lane is chosen by the decision device, the deceleration limit can vary based on selected driving mode. In particular, the driving modes can be eco, comfort and sports, whereby the fastest deceleration might be achieved by the sports mode. The slowest deceleration might be achieved by the eco or the comfort mode. This depends on the environmental conditions, which can have an influence on the most economical way of driving.

A further, second strategy to gain the core priority is to combine braking and steering within the ego lane 16 of the ego vehicle 10, whereby this second strategy or step is preferably a strategy subordinate to the first strategy of (only) braking in the ego lane. This step is subordinate because the driver perceives an unrest due to the additional steering in addition to braking, and drivers of surrounding vehicles may also be distracted by the driving maneuver of the ego vehicle. In particular, this logic should only be applied if collision avoidance is guaranteed by both strategies.

A next preferred, third strategy to gain the core priority is (only) steering within the ego lane 16 of the ego vehicle 10 to avoid an obstacle, whereby this third strategy or step is preferably a strategy subordinate to the second strategy to combine braking and steering within the ego lane 16 of the ego vehicle 10. This step is subordinate to the above steps because it has been found that a steering maneuver without deceleration increases the driver's stress due to the essentially constant speed during the steering process.

The priority which strategy (or step) is selected depends in particular on the prioritization between the strategies. In particular, the prioritization between combining the second strategy of braking and steering within the ego lane 16 of the ego vehicle 10 and the third strategy of (only) steering within the ego lane 16 of the ego vehicle 10 to avoid an obstacle can be based on the relative speed between the ego vehicle 10 and the obstacle. Optionally or in addition to the relative speed, the available space or distance between the ego vehicle 10 and the obstacle (e.g. third party vehicle 24) can also be relevant.

Next, it may be envisaged that a strategy to gain the core priority is to full-brake in the ego lane 16 of the ego vehicle 10, whereby this step happens preferably up to the allowed emergency braking threshold, and whereby this step is preferably a strategy subordinate to steering within the ego lane 16 of the ego vehicle 10 to avoid an obstacle. Although an emergency braking maneuver increases the probability that an accident will be avoided, this step is not a common means of preventing the driver from feeling unwell on the road. For this reason, the step is subordinate to the step steering within the ego lane 16 of the ego vehicle 10 to avoid an obstacle. However, it is preferable that this step happens preferably up to the allowed emergency braking threshold, at least if the driver's safety can be guaranteed in order not to strain the driver's confidence in the ego vehicle 10.

Another preferred embodiment of the invention is that a strategy to gain the core priority is to combine braking and steering towards/entering temporarily adjacent lane 12a, 12b, whereby this step is preferably a strategy subordinate to to full-brake in the ego lane 16 of the ego vehicle 10. The subordinated classification is based on the recognition that although a full-brake puts more physical strain on the driver than a lane change, but the ego vehicle 10 cannot predict the driving behavior of the surrounding vehicles, so that the driver's safety should be guaranteed at this point.

According to a modified embodiment of the invention, a last strategy to gain the core priority is steering towards/entering temporarily adjacent lane 12a, 12b, whereby this step is preferably a strategy subordinate to combine braking and steering towards/entering temporarily adjacent lane 12a, 12b. One possible advantage of this sequence is that by steering to an adjacent lane 12a, 12b without braking, obstacles approaching from the front, such as uncontrolled oncoming vehicles, can be avoided faster and thus more safely than would be the case with a combination of steering and braking. The basic assumption is that a lateral accident is less risky than a frontal accident.

The present invention also provides a system for providing a multi-lane scenario driving support for an ego vehicle 10 in a traffic situation, using a method according to any of the preceding features and comprising an environment sensor system 14 according to any of the preceding features and a decision device 22 according to any of the preceding features.

A preferred embodiment of the invention is that the environment sensor system 14 includes a front camera. A camera has the advantage that on the one hand it is inexpensive and on the other hand it tends towards the highest possible measurement quality due to its high resolution.

In order to further increase the measuring quality, it may be provided that the environment sensor system 14 includes a radar cocoon. A radar has a lower resolution than a camera, but a radar is weather-independent, because the long wavelengths are hardly disturbed by the atmosphere and therefore fog, light rain and snow can be penetrated, so that safety can be significantly increased. In addition, a radar is independent of lighting conditions, which makes day and night measurements possible, which also increases the safety. A cocoon has the advantage of 360 degrees detection.

The measuring quality can also be increased if, for example the environment sensor system 14 includes a laser scanner cocoon. Laser measurements have the advantage that they are very precise and also have a very short reaction time, so that safety can be significantly increased. A cocoon has the advantage of 360 degrees detection.

In order to increase the driver's safety as far as possible, it can be advantageous that measurement data from the vicinity of the vehicle are recorded as completely as possible. Therefore, a preferred embodiment of the invention is that the environment sensor system 14 includes a fully surround system.

In particular, it is foreseen that the sensory units of the environment sensor system 14 may be cumulative or redundant. This increases the measurement quality and reduces the risk of wrong decisions of the decision device 22 based on missing or wrong measurement results.

REFERENCE SIGNS LIST 10 ego vehicle
12a adjacent lane
12b adjacent lane
12b' adjacent lane
14 environment sensor system
16 ego lane
18 front proximity area
20 rear proximity area
22 decision device
24 third party vehicle

The invention claimed is:

1. A method for providing a multi-lane scenario driving support for an ego vehicle in a traffic situation in which an ego lane is partly or fully obstructed by other traffic participants, the method comprising:
measuring traffic surroundings by an environment sensor system,
wherein the traffic surroundings include data about traffic and free space within the ego lane of the ego vehicle and at least one adjacent lane, and data about front proximity area and rear proximity area of the ego vehicle;
evaluating, by a decision device the measured traffic surroundings together with the speed of the ego vehicle and deciding a driving operation to be executed by the ego vehicle based on at least one strategy,
wherein in the decision device a cost function is used for choosing one of at least six strategies, the cost function being based on at least a core priority, whereby the core priority is to avoid collision of the ego vehicle and not cause collision of the ego vehicle with a third party vehicle, whereby the decision device by the cost function chooses one selected from the group consisting of at least the following six strategies: braking in the ego lane, to combine braking and steering within the ego lane of the ego vehicle, steering within the ego lane of the ego vehicle to avoid an obstacle, to full-brake in the ego lane of the ego vehicle, to combine braking and steering towards or when entering temporarily the adjacent lane and steering towards or when entering temporarily the adjacent lane;
wherein the cost function is used in mathematical optimization and decision theory for mapping an event, finding a real number representing a cost associated with the event, and choosing the one of the at least six strategies with a lowest cost; and
wherein the decision device by the cost function chooses the strategies in the following order:
braking in the ego lane,
to combine braking and steering within the ego lane of the ego vehicle,
steering within the ego lane of the ego vehicle to avoid the obstacle,
to full-brake in the ego lane of the ego vehicle,
to combine braking and steering towards or when entering temporarily the adjacent lane, and
steering towards or when entering temporarily the adjacent lane.

2. The method according to claim 1, wherein the cost function for choosing one of the at least six strategies is based on a core priority parameter, and assuming that core priority is guaranteed, at least one of the following additional parameters:
minimum lateral acceleration of the ego vehicle,
minimum longitudinal acceleration of the ego vehicle, and
avoid leaving the ego lane.

3. The method according to claim 1, wherein a first strategy to gain the core priority is only braking in the ego lane.

4. The method according to claim 3, wherein the braking in the ego lane happens with a deceleration up to and including −5 m/s².

5. The method according to claim 3, wherein a deceleration limit varies based on selected driving mode.

6. The method according to claim 3, wherein a second strategy to gain the core priority is to combine braking and steering within the ego lane of the ego vehicle, whereby this second strategy is a strategy subordinate to the first strategy of only braking in the ego lane.

7. The method according to claim 6, wherein a third strategy to gain the core priority is only steering within the ego lane of the ego vehicle to avoid the obstacle, whereby the third strategy is a strategy subordinate to the second strategy to combine braking and steering within the ego lane of the ego vehicle.

8. The method according to claim 7, wherein the prioritization between the second strategy to combine braking and steering within the ego lane of the ego vehicle and the third strategy of only steering within the ego lane of the ego vehicle to avoid the obstacle is based on the relative speed between the ego vehicle and the obstacle.

9. The method according to claim 7, wherein a fourth strategy to gain the core priority is to only full-brake in the ego lane of the ego vehicle, wherein the fourth strategy is a strategy subordinate to the third strategy of only steering within the ego lane of the ego vehicle to avoid the obstacle.

10. The method according to claim 9, wherein a fifth strategy to gain the core priority is to combine braking and steering towards or when entering temporarily the adjacent lane, wherein the fifth strategy is a strategy subordinate to the fourth strategy to only full-brake in the ego lane of the ego vehicle.

11. The method according to claim 10, wherein a sixth strategy to gain the core priority is only steering towards or when entering temporarily the adjacent lane, wherein the sixth strategy is a strategy subordinate to the fifth strategy to combine braking and steering towards/entering temporarily the adjacent lane.

12. The method according to claim 1, wherein the decision device takes data about map information and a planned driving activity into account.

13. A system for providing the multi-lane scenario driving support for the ego vehicle in the traffic situation, using the method according to claim 1, the system comprising: the environment sensor system and the decision device.

14. The system according to the claim 13, wherein the environment sensor system includes a front camera, a radar cocoon and/or a laser scanner cocoon.

* * * * *